United States Patent
Araki et al.

(10) Patent No.: US 9,580,309 B2
(45) Date of Patent: Feb. 28, 2017

(54) AMMONIA OXIDATION/DECOMPOSITION CATALYST

(75) Inventors: Sadao Araki, Osaka (JP); Susumu Hikazudani, Osaka (JP); Takuma Mori, Osaka (JP); Akira Taniguchi, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 0 days.

(21) Appl. No.: 13/819,070

(22) PCT Filed: Aug. 31, 2010

(86) PCT No.: PCT/JP2010/064799
§ 371 (c)(1),
(2), (4) Date: Feb. 26, 2013

(87) PCT Pub. No.: WO2012/029122
PCT Pub. Date: Mar. 8, 2012

(65) Prior Publication Data
US 2013/0156687 A1 Jun. 20, 2013

(51) Int. Cl.
| | | |
|---|---|---|
| C01B 3/50 | (2006.01) |
| C01B 3/04 | (2006.01) |
| B01J 23/00 | (2006.01) |
| B01J 23/10 | (2006.01) |
| B01J 23/14 | (2006.01) |
| B01J 23/22 | (2006.01) |
| B01J 23/26 | (2006.01) |
| B01J 23/34 | (2006.01) |
| B01J 23/63 | (2006.01) |
| B01J 23/66 | (2006.01) |
| B01J 23/83 | (2006.01) |
| B01J 37/02 | (2006.01) |
| B01J 37/03 | (2006.01) |

(52) U.S. Cl.
CPC ............ C01B 3/047 (2013.01); B01J 23/002 (2013.01); B01J 23/10 (2013.01); B01J 23/14 (2013.01); B01J 23/22 (2013.01); B01J 23/26 (2013.01); B01J 23/34 (2013.01); B01J 23/63 (2013.01); B01J 23/66 (2013.01); B01J 23/83 (2013.01); B01J 37/0201 (2013.01); B01J 37/031 (2013.01); B01J 2523/00 (2013.01); Y02E 60/364 (2013.01)

(58) Field of Classification Search
CPC ........... C01B 3/047; B01J 23/14; B01J 23/002
USPC ..................................................... 423/658.2
See application file for complete search history.

(56) References Cited

U.S. PATENT DOCUMENTS

| | | | | |
|---|---|---|---|---|
| 4,171,288 A | * | 10/1979 | Keith et al. ................... 502/304 |
| 5,055,282 A | * | 10/1991 | Shikada et al. ............... 423/351 |
| 5,108,730 A | | 4/1992 | Lee et al. |
| 2007/0110643 A1 | * | 5/2007 | Sobolevskiy et al. ........ 422/177 |

FOREIGN PATENT DOCUMENTS

| | | | |
|---|---|---|---|
| EP | 2332646 A1 | 6/2011 | |
| JP | 63-72344 A | 4/1988 | |
| JP | 08-089758 A | 4/1996 | |
| JP | 2006-289211 A | 10/2006 | |
| JP | 2007-504945 A | 3/2007 | |
| JP | 4165661 B | 8/2008 | |
| JP | 2009-254981 A | 11/2009 | |
| JP | 2010-094668 * | 4/2010 | ............ B01J 23/755 |
| JP | 2010-094668 A | 4/2010 | |
| JP | 2010-207783 A | 9/2010 | |
| JP | 2010-240646 A | 10/2010 | |
| WO | WO-98/28073 | 7/1998 | |
| WO | WO-01/87770 A1 | 11/2001 | |
| WO | WO-2005/025724 A1 | 3/2005 | |
| WO | WO-2009/050323 A1 | 4/2009 | |
| WO | WO-2010/032790 A1 | 3/2010 | |

OTHER PUBLICATIONS

Muroi. "Industrial noble metal catalysts", p. 297, May 26, 2003.*
Machine translation of JP 2010-094668.*
International Search Report, issued for corresponding PCT Patent Application No. PCT/JP2010/064799, dated Dec. 7, 2010.
W. Zheng et al., "Effects of $CeO_2$ addition on $Ni/Al_2O_3$ catalysts for the reaction of ammonia decomposition to hydrogen," Applied Catalysts B: Environmental 80, 98-105, (2008).
Extended European Search Report, issued in corresponding European Patent Application No. EP 10856674.6, dated Sep. 30, 2016.

* cited by examiner

*Primary Examiner* — Paul Wartalowicz
(74) *Attorney, Agent, or Firm* — Locke Lord LLP; James E. Armstrong, IV; Nicholas J. DiCeglie, Jr.

(57) ABSTRACT

The present invention provides an ammonia oxidation/decomposition catalyst including a support composed of an oxidizable and reducible metal oxide and a catalytically active metal supported thereon. By bringing the ammonia oxidation/decomposition catalyst including a support composed of an oxidizable and reducible metal oxide and a catalytically active metal supported thereon into contact with ammonia and air at room temperature, the support in a reduced state reacts with oxygen to generate oxidation heat, and the temperature of the catalyst layer is increased in a moment. Once the temperature of the catalyst layer is increased to a temperature at which ammonia and oxygen react with each other, the ammonia oxidation reaction proceeds autonomously after that. The heat generated in this exothermic reaction is used in the course of decomposing ammonia in the presence of the catalytically active metal, thereby producing hydrogen.

1 Claim, No Drawings

AMMONIA OXIDATION/DECOMPOSITION CATALYST

TECHNICAL FIELD

The present invention relates to an ammonia oxidation/decomposition catalyst which is provided for a reaction of producing hydrogen from ammonia. The term "metal" as referred to in the present description and claims also includes a semi-metal such as silicon.

BACKGROUND ART

In order to produce hydrogen upon decomposition of ammonia in the presence of an ammonia decomposition catalyst, it is necessary to allow a reaction of the following equation (I) to proceed at a reaction temperature of 350° C. or higher.

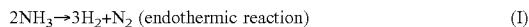

$$2NH_3 \rightarrow 3H_2 + N_2 \text{ (endothermic reaction)} \quad (I)$$

Though it is possible to allow the reaction of the equation (I) to proceed using a ruthenium based catalyst at a reaction temperature of 400° C. or higher, this reaction is an endothermic reaction, and therefore, in order to obtain a stable decomposition rate of ammonia, it is necessary to give heat to the reaction system.

A temperature drop in the case where 100% of ammonia is decomposed is about 900° C. In order to set a gas temperature in a downstream region of the catalyst layer at, for example, 350° C. or higher, it is necessary to set an inlet gas temperature at 1,250° C. or higher, and hence, such is not practical. Then, in order to suppress the gas temperature drop to be caused due to the endothermic reaction, heat was conventionally supplied from the outside. However, according to this method, since a rate of heat transfer is slower than the reaction rate, in order to obtain a sufficient rate of heat transfer, an area of heat-transfer surface must be made large, and it is difficult to achieve compactification of the apparatus.

In addition, a method of utilizing an exhaust gas of an ammonia engine as a heat source of heat supply from the outside may be considered. However, according to this method, in the case where the temperature of an engine exhaust gas is not higher than 350° C., this temperature is lower than a temperature at which the catalyst works. Therefore, there is involved such a drawback that the heat supply cannot be achieved, so that a prescribed amount of hydrogen cannot be produced.

As the heat source of heat supply, in addition to the supply from the outside, there is a method of generating heat by a reaction between ammonia and oxygen as shown in the following equation (II) and utilizing this heat.

$$NH_3 + \tfrac{3}{4}O_2 \rightarrow \tfrac{1}{2}N_2 + 3/2 H_2O \text{ (exothermic reaction)} \quad (II)$$

If the reactions of the equations (1) and (2) are made to take place in the same reaction tube, it is possible to compensate heat for the endothermic reaction of the equation (I) by heat generated in the equation (II). In addition, by controlling the oxygen amount in the equation (II), the temperature of a catalyst layer can be controlled. For example, in the case where the temperature of a supply gas pre-heated by heat exchange of waste heat of the engine exhaust gas fluctuates, it becomes possible to stably produce hydrogen.

As a catalyst for ammonia oxidation, a platinum based catalyst is generally used. For example, Patent Document 1 proposes a multilayered ammonia oxidation catalyst composed of a refractory metal oxide, a layer of platinum disposed on this refractory metal oxide, and a layer of vanadia disposed on this platinum.

However, the working temperature of this catalyst is about 200° C., and if the temperature is not higher than this temperature, the oxidation reaction cannot be allowed to proceed, and hence, it is necessary to increase the gas temperature to about 200° C. by an electric heater or the like.

Patent Document 2 proposes an ammonia oxidation catalyst composed of an oxide of at least one element selected from cerium and praseodymium, an oxide of at least one element selected from non-variable valency rare earth elements including yttrium, and an oxide of cobalt. In addition, Patent Document 3 proposes an ammonia oxidation catalyst containing filaments substantially composed of platinum and rhodium and if desired, palladium, the filaments having a platinum coating. However, these patent documents have the same problem as that in Patent Document 1, too.

PRIOR ART DOCUMENTS

Patent Documents

Patent Document 1: JP-T-2007-504945
Patent Document 2: Japanese Patent No. 4165661
Patent Document 3: JP-A-63-72344

SUMMARY OF THE INVENTION

Problem to be Solved by the Invention

An object of the present invention is to provide an ammonia oxidation/decomposition catalyst capable of overcoming the foregoing problems.

Means for Solving the Problem

The present invention is concerned with an ammonia oxidation/decomposition catalyst comprising a support composed of an oxidizable and reducible metal oxide and a catalytically active metal (also called a supported metal) supported thereon.

The metal oxide may be a composite oxide.

The metal oxide is preferably a rare earth metal oxide.

The oxidizable and reducible metal oxide refers to a metal capable of being reversibly converted between an oxidized state and a reduced state.

Preferred examples of the oxidizable and reducible metal oxide include rare earth metal oxides such as cerium oxide, lanthanum oxide, samarium oxide, etc. In addition, the oxidizable and reducible metal oxide may also be a composite oxide of a rare earth metal and at least one metal selected from the group consisting of magnesium, titanium, zirconium, yttrium, aluminum, silicon, cobalt, iron, and gallium. In addition, it may also be a composition oxide of a rare earth metal and at least two metals selected from the group consisting of magnesium, titanium, zirconium, yttrium, aluminum, silicon, cobalt, iron, and gallium.

The catalytically active metal which is supported on the support is preferably at least one metal selected from the group consisting of a metal belonging to the Group VIII, such as ruthenium, platinum, rhodium, palladium, iron, cobalt, nickel, etc., tin, copper, silver, manganese, chromium, and vanadium.

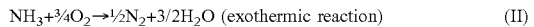

The ammonia oxidation/decomposition catalyst according to the present invention is provided for an ammonia oxidation/decomposition reaction after a heat treatment in a hydrogen gas stream at 200° C. or higher, preferably from 200 to 700° C., and especially preferably from 200 to 600° C. and subsequently, reduction of a part or the whole of the metal oxide constituting the support. The reduction treatment of the ammonia oxidation/decomposition catalyst may be carried out either prior to or after charging in the same catalyst reactor.

The support of the ammonia oxidation/decomposition catalyst can be, for example, prepared in the following method.

1. A metal salt, for example, a nitrate, is used as a precursor of the support, and an aqueous solution thereof is treated with an ammonia aqueous solution to deposit a metal hydroxide. In the case of a composite oxide, concentrations of plural metal salts are adjusted such that concentrations of aqueous solutions of the metal salts are equimolar to each other.

2. A liquid containing the deposit is subjected to centrifugation.

3. The deposit is recovered and dried at, for example, 120° C.

4. The dried deposit is calcined in air at, for example, 700° C. to obtain the support.

A method of supporting the catalytically active metal on the thus prepared support to obtain the ammonia oxidation/decomposition catalyst is, for example, as follows.

1. As a precursor of a noble metal based metal, for example, a metal chloride or a metal acid chloride is used, and as a precursor of a base metal based metal, for example, a nitrate is used.

2. The above-described metal precursor is dissolved in water, and the above-obtained support is dispersed in the aqueous solution such that the supporting amount of the catalytically active metal is a prescribed value.

3. This dispersion liquid is heated to gradually evaporate the solvent.

4. The obtained powder is calcined in air at, for example, 300° C. to obtain the ammonia oxidation/decomposition catalyst.

The above-described ammonia oxidation/decomposition catalyst is charged in a reactor, and reduction of the support is carried out in a hydrogen gas stream while heating at, for example, 600° C. Subsequently, when the resultant is brought into contact with ammonia and air at room temperature, the support in a reduced state first reacts with oxygen to generate oxidation heat, and the temperature of the catalyst layer is increased in a moment. Once the temperature of the catalyst layer is increased to a temperature (200° C.) at which ammonia and oxygen react with each other, the ammonia oxidation reaction proceeds autonomously after that according to the above-described equation (ii). The heat generated in this exothermic reaction (ii) is used in the course of decomposing ammonia in the presence of the catalytically active metal according to the above-described equation (i), thereby producing hydrogen.

Effect of the Invention

As described above, by bringing ammonia and air into contact with the ammonia oxidation/decomposition catalyst comprising a support composed of an oxidizable and reducible metal oxide and a catalytically active metal supported thereon according to the present invention at room temperature, the support in a reduced state first reacts with oxygen to generate oxidation heat, and the temperature of the catalyst layer is increased in a moment. Once the temperature of the catalyst layer is increased to a temperature at which ammonia and oxygen react with each other, the ammonia oxidation reaction proceeds autonomously after that. The heat generated in this exothermic reaction (ii) is used in the course of decomposing ammonia in the presence of the catalytically active metal according to the above-described equation (i), thereby producing hydrogen. According to this, the need for pre-heating by an electric heater or the like can be eliminated, and the production costs of hydrogen can be reduced.

MODES FOR CARRYING OUT THE INVENTION

Next, in order to specifically describe the present invention, some Examples of the present invention and Comparative Examples for comparing them are given.

EXAMPLES 1 TO 22 a) Preparation of Support:

1. A nitrate was used as a precursor of each of supports shown in Table 1, and an ammonia aqueous solution (concentration: 28 wt %) in an amount corresponding to 1.2 times of a stoichiometric amount of a metal was added to this nitrate aqueous solution (concentration: 0.4 moles/L), thereby depositing a metal hydroxide. In the case of a composite oxide, concentrations of plural metal salts were adjusted such that concentrations of aqueous solutions of the metal salts were equimolar to each other.

2. A liquid containing the deposit was subjected to centrifugation.

3. The deposit was recovered and dried at 120° C.

4. The dried deposit was calcined in air at 700° C. There were thus obtained respective supports.

b) Supporting of Catalytically Active Metal:

1. Among catalytically active metals shown in Table 1, ruthenium chloride, chloroplatinic acid, rhodium chloride, and palladium nitrate were used as the precursor of a noble metal based metal, and a nitrate was used as the precursor of a base metal based metal.

2. The metal precursor was dissolved in pure water, and the support as obtained above was dispersed in this aqueous solution such that the supporting amount of the catalytically active metal was 2% by weight (in terms of the metal).

3. This dispersion liquid was heated to gradually evaporate the water.

4. The obtained powder was calcined in air at 300° C. to obtain an ammonia oxidation/decomposition catalyst containing 2% by weight of the catalytically active metal.

COMPARATIVE EXAMPLES 1 TO 2

1. Ruthenium chloride was dissolved in water, and aluminum oxide or silicon oxide was dispersed in this solution such that the supporting amount of the catalytically active metal was 2% by weight (in terms of the metal).

2. This dispersion liquid was heated to gradually evaporate the water.

3. The obtained powder was calcined in air at 300° C. to obtain an ammonia oxidation/decomposition catalyst containing 2% by weight of the catalytically active metal.

Performance Test:

With respect to the ammonia oxidation/decomposition catalysts obtained in the Examples and Comparative Examples, a performance test was carried out in the following method.

The ammonia oxidation/decomposition catalyst was charged in a charge amount shown in Table 1 in a flow-type reactor and then heated in a hydrogen gas stream at 600° C. for 2 hours, thereby subjecting the catalyst to a reduction treatment. After cooling to room temperature, an ammonia gas and air were supplied to this reactor. The supply amount of ammonia was kept constant at 100 NL/min, and the supply amount of air was set at air/$NH_3$ of 1. An outlet temperature of the ammonia oxidation/decomposition catalyst and a generation amount of hydrogen were measured. The measurement of the generation amount of hydrogen was carried out by measuring the gas concentration by a mass analyzer. The test results are shown in Table 1.

TABLE 1

| Example | Catalyst and charge amount | | | Oxidation rate of ammonia | Yield of hydrogen |
|---|---|---|---|---|---|
| | Support | Supported metal | Charge amount | | |
| 1 | Cerium oxide | Ruthenium | 40 mL | 100 | 40 |
| 2 | Cerium oxide | Ruthenium | 150 mL | 100 | 70 |
| 3 | Lanthanum oxide | Ruthenium | 40 mL | 100 | 32 |
| 4 | Samarium oxide | Ruthenium | 40 mL | 100 | 30 |
| 5 | Ce-Zr composite oxide | Ruthenium | 40 mL | 100 | 43 |
| 6 | Ce-Ti composite oxide | Ruthenium | 40 mL | 100 | 38 |
| 7 | Ce-Mg composite oxide | Ruthenium | 40 mL | 100 | 38 |
| 8 | Ce-Zr-Al composite oxide | Ruthenium | 40 mL | 100 | 45 |
| 9 | Ce-Zr-Si composite oxide | Ruthenium | 40 mL | 100 | 42 |
| 10 | Cerium oxide | Platinum | 40 mL | 100 | 18 |
| 11 | Lanthanum oxide | Platinum | 40 mL | 100 | 8 |
| 12 | Samarium oxide | Platinum | 40 mL | 100 | 6 |
| 13 | Cerium oxide | Platinum | 40 mL | 100 | 18 |
| 14 | Cerium oxide | Rhodium | 40 mL | 100 | 35 |
| 15 | Cerium oxide | Palladium | 40 mL | 100 | 15 |
| 16 | Cerium oxide | Iron | 40 mL | 100 | 12 |
| 17 | Cerium oxide | Cobalt | 40 mL | 100 | 39 |
| 18 | Cerium oxide | Nickel | 40 mL | 100 | 38 |
| 19 | Cerium oxide | Manganese | 40 mL | 100 | 30 |
| 20 | Cerium oxide | Chromium | 40 mL | 100 | 12 |
| 21 | Cerium oxide | Vanadium | 40 mL | 100 | 18 |
| 22 | Cerium oxide | Tin | 40 mL | 100 | 3 |
| Comparative Example 1 | Aluminum oxide | Ruthenium | 40 mL | 0 | 0 |
| Comparative Example 2 | Silicon oxide | Ruthenium | 40 mL | 0 | 0 |

As is clear from Table 1, by using the ammonia oxidation/decomposition catalyst according to the present invention, the ammonia oxidation reaction can be started up at room temperature, hydrogen can be obtained in a high yield upon decomposition of ammonia without adopting pre-heating by an electric heater or the like, and a decrease in the cost of production of hydrogen can be achieved.

INDUSTRIAL APPLICABILITY

By using the ammonia oxidation/decomposition catalyst according to the present invention, the need for pre-heating by an electric heater or the like can be eliminated, and the production costs of hydrogen can be reduced.

The invention claimed is:

1. A process for producing hydrogen by carrying out oxidation/decomposition of ammonia in the presence of an ammonia oxidation/decomposition catalyst comprising a support composed of an oxidizable and reducible metal oxide and a catalytically active metal supported thereon, the process comprising:
   reducing the support by heating in a hydrogen stream,
   bringing ammonia and air into contact with the catalyst at room temperature, and
   decomposing ammonia in the presence of the catalyst, thereby producing hydrogen;
wherein: the metal oxide is a composite oxide comprising a rare earth metal oxide;
   the rare earth metal oxide is samarium oxide;
   the catalytically active metal is at least one metal selected from the group consisting of copper, silver, manganese, chromium, and vanadium; and
   the hydrogen stream is heated to 200° C. or higher.

* * * * *